United States Patent [19]

Mark et al.

[11] Patent Number: 4,730,035

[45] Date of Patent: Mar. 8, 1988

[54] DRYING AND REMOVING RESIDUAL ACID FROM HALOGENATED POLYMER RESINS

[75] Inventors: Frank E. Mark, Schaferstieg, Fed. Rep. of Germany; Charles B. Carpenter, Sunshine; James B. Akers, Jr., Baton Rouge, both of La.

[73] Assignee: The Dow Chemical Company, Midland, Mich.

[21] Appl. No.: 903,635

[22] Filed: Sep. 4, 1986

[51] Int. Cl.$^4$ .............................................. C08F 6/00
[52] U.S. Cl. .................................. 528/502; 528/480; 528/483
[58] Field of Search ..................... 528/480, 483, 502

[56] References Cited

U.S. PATENT DOCUMENTS

| 3,074,923 | 1/1963 | Cosby | 528/483 |
| 3,677,321 | 7/1972 | Felstead | 528/483 |
| 4,260,721 | 4/1981 | Ford | 528/480 |
| 4,381,392 | 4/1983 | Pontoglio | 528/493 |

Primary Examiner—Christopher Henderson
Attorney, Agent, or Firm—D. R. Howard

[57] ABSTRACT

Moist halogenated resins separated from an aqueous acid suspension of said resins are dried and stripped of residual acid with a heated inert drying gas. The resins are not washed to lower residual acid or treated with a base compound to neutralize residual acid before drying begins. Inert drying gases include nitrogen, helium, argon and the like. The dried resin has low residual acid and moisture levels. It is white and free of visually detectable areas of discoloration. It also has high thermal stability, particularly when admixed with minor amounts of a thermal stabilizer such as calcium stearate.

30 Claims, No Drawings

DRYING AND REMOVING RESIDUAL ACID FROM HALOGENATED POLYMER RESINS

BACKGROUND OF THE INVENTION

This invention generally concerns a process for removing residual acid from moist halogenated polymer resins during drying thereof. This invention more particularly concerns use of an inert drying gas to remove residual acid from moist halogenated polymer resins during drying thereof.

Polyolefins, e.g. polyethylene, are generally halogenated while in the form of finely-divided particles. One process provides for halogenation of the particles while they are suspended in an aqueous medium. A similar process provides for halogenation of the particles while they are suspended in a halogen-resistant solvent system which does not appreciably dissolve the resin. Polyolefin resins may also be halogenated while dissolved in a solvent system. These processes generate a considerable amount of acid, e.g. hydrochloric acid if the halogen is chlorine. The acid is dispersed throughout the aqueous medium or solvent system as well as within and on the surface of the particles. The acid must be removed or neutralized if the halogenated polymer is to be useful for thermoplastic and elastomer applications.

Batch or continuous water washing to remove residual acid gives rise to polymer particle agglomeration as noted by Ohorodnik et al. in U.S. Pat. No. 4,440,925. Staged water washing is time consuming. It is costly because of needs for process water preparation and waste water cleanup. It also requires the use of additives like surfactants or low boiling alcohols to enhance removal of acid from within the polymer particles. If further requires the use of acid-resistant equipment to remove aqueous acid from the polymer between wash cycles. Neutralization of the acid by adding caustic soda or some other alkaline or base material leads to the formation of acid salts within and on the surface of polymer particles. The presence of such salts results in poor electrical properties and high water swell.

Halogenated polymer resins separated from the suspension medium, either without a water wash or with limited water washing, have high residual acid contents. Drying such resins with heated air leads to product quality problems, particularly in the areas of product color and thermal stability.

Nitrogen purging of chlorinated polymers prepared by solution chlorination is described in U.S. Pat. Nos. 4,381,392, 4,358,402, 4,122,249, Japanese Patent publication No. 5,408,139 and Belgian Patent No. 850,493. The purpose of the purge is to remove excess chlorine. Chlorinated hydrocarbon solvents can be removed by steam stripping or nitrogen purging.

It would be desirable if there were available a process for removing residual acid from halogenated polymer resins which did not include one or more water wash steps or cycles. It would also be desirable if such a process did not require the use of additives such as surfactants to aid in removal of residual acid. It would further be desirable if such a process did not require an acid neutralization step.

SUMMARY OF THE INVENTION

In one aspect, the present invention is a process for drying, and stripping residual acid from, a moist halogenated resin separated from an aqueous acid suspension of said resin, the moist halogenated resin having a water content of from about 60 to about 15 weight percent, based upon combined weight of water and resin, and a residual acid loading of from about 80,000 to about 1,000 parts by weight of acid per million parts by weight of halogenated resin, based upon dry weight of halogenated resin, the process comprising:

Passing a heated inert drying gas through the moist halogenated resin at a rate of flow sufficient to establish and maintain the admixture as a fluidized bed and for a period of time sufficient to produce a dried polymer resin having a water content of from about 0.05 to about 4 weight percent, based upon combined weight of water and resin, and a residual acid loading of from about 5,000 to about 200 parts by weight of acid per million parts by weight of halogenated resin, based upon dry weight of halogenated resin, the dried polymer resin being white in color with no visually detectable areas of discoloration. The residual acid loading of the dried polymer resin is desirably from about 1000 to about 200 parts by weight of acid per million parts by weight of halogenated resin, based upon dry weight of halogenated resin. The dried polymer resin also shows excellent thermal stability as reflected by the amount of acid, e.g., hydrochloric acid, released from the resin at elevated temperatures, e.g., about 125° Centigrade, as a function of time.

If the halogenated resin exhibits a tendency to agglomerate during drying, a preliminary step is added to the foregoing process. The preliminary step comprises preparing an admixture of the moist halogenated resin and at least one organic or inorganic particulate additive, the additive(s) being present in an amount sufficient to generally preclude agglomeration of resin particles during drying thereof. The preliminary step is generally not necessary when small quantities of moist halogenated polymer resin are dried.

The term "residual acid loading" is used herein to provide a parameter which does not have a base which changes during drying of the halogenated resins. Residual acid loading is a value calculated according to Formula I.

$$\text{(I) Residual Acid Loading} = \text{PPM-Wet} \div \text{Percent Solids.} \tag{I}$$

"PPM-Wet" is calculated according to Formula II.

$$\text{(II) PPM-Wet} = \text{Weight of acid in sample} \div \text{total sample weight.} \tag{II}$$

wherein total sample weight is the combined weights of acid, resin and water in a sample. "Percent Solids" is determined by weighing a sample before and after drying the sample until no further weight change is observed.

In a second aspect, the present invention is a process for drying, and stripping residual acid from, a moist halogenated resin separated from an aqueous acid suspension of said resins, said moist resins having a water content of from about 60 to about 15 weight percent, based upon combined weight of water and resin, and a residual acid loading of from about 80,000 to about 1,000 parts of acid per million parts of resin, based upon dry weight of halogenated resin, the process comprising:

a. passing a first heated drying gas through the moist halogenated resin at a rate of flow sufficient to establish and maintain said admixture as a fluidized bed and for a period of time sufficient to produce a partially dried polymer resin having a water content of from about 5 to about 50 weight percent, based upon combined weight of water and resin, and a residual acid loading of from about 800 to about 30,000 parts by weight of acid per million parts by weight of halogenated resin based upon dry weight of halogenated resin; and b. continuing to maintain the fluidized bed while passing a second heated drying gas therethrough for a period of time sufficient to produce a nearly dry resin having a water content of from about 3 to about 30 weight percent, based upon combined weight of water and resin, and a residual acid loading of from about 600 to about 20,000 parts by weight of acid per million parts of halogenated resin, based upon dry weight of halogenated resin, the nearly dry resin being white with no visually detectable areas of discoloration. Skilled artisans recognize that as the resin dries, it becomes lighter and capable of being fluidized at lower fluidization velocities. This step may be subdivided into any number of intermediate drying steps if desired. A multi-stage dryer would provide adequate subdivision.

As noted in regard to the first aspect, a preliminary step may be added if the halogenated resin displays a tendency to agglomerate during drying. The preliminary step comprises preparing an admixture of the moist halogenated polymer resin and at least one organic or inorganic particulate additive, said additive being present in an amount sufficient to generally preclude agglomeration of the resin during drying thereof. The preliminary step is generally unnecessary for small quantities of moist halogenated resin.

The process disclosed in the second aspect may be further modified to comprise a step c wherein the nearly dry resin is maintained as a fluidized bed by passing the second heated drying gas therethrough for a period of time sufficient to reduce the water content to a level of from about 0.05 to about 4 weight percent, based upon combined weight of resin and water, and the residual acid loading to a level of from about 5000 to about 200 parts per million parts of resin, based upon dry weight of resin. The residual acid loading is desirably reduced to a level of from about 1000 to about 200 parts per million parts of resin, based upon dry weight of resin.

DESCRIPTION OF THE PREFERRED EMBODIMENTS

The present invention is applicable to a wide variety of halogenated polyolefin resins. The halogenated resins may contain at least one of chlorine, fluorine or bromine. The resins are beneficially chlorinated polyolefins, desirably chlorinated polyethylenes. The chlorinated polyethylene resins are suitably prepared by chlorination of essentially linear, finely-divided high density polyethylene or olefin interpolymers containing at least about 90 mole percent of ethylene in the interpolymer molecule. The olefin interpolymers also contain up to about ten mole percent of one or more ethylenically unsaturated monomers copolymerizable with ethylene. Illustrative monomers include non-aromatic hydrocarbon olefins having three or more carbon atoms such as propylene, butene-1, octene, 1,7-octadiene and the like; substituted olefins such as acrylic acid, acrylic acid esters and the like; alkenyl aromatic compounds such as styrene and its derivatives; and other known copolymerizable monomers. The chlorinated polyethylene resins are suitably prepared by suspension chlorination as disclosed in U.S. Pat. No. 3,454,544, the teachings of which are incorporated herein by reference thereto. The chlorinated resins may also be prepared by other known suspension or slurry processes, particularly aqueous suspension or slurry processes.

Following completion of halogenation, aqueous slurries or suspensions of halogenated polymer resins typically have a polymer solids content of from about eight to about twenty-five percent by weight, based upon weight of slurry. Passing the slurry through a dewatering device serves two purposes. First, it removes a substantial quantity of residual acid with the water. Second, it provides a moist halogenated resin suitable for further processing as described herein. The moist halogenated resin typically has a residual acid loading of from about 80,000 to about 1,000 parts by weight of acid per million parts by weight of halogenated resin, based upon dry weight of resin. Residual acid loadings in excess of about 80,000 parts by weight are undesirable because they are highly corrosive. Residual acid loadings of less than about 1,000 parts by weight, are attainable either with water washing or with halogenated resins prepared by a very low solids content aqueous halogenation process. Neither alternative is economically attractive. In addition, the former requires large amounts of water, a requirement the present invention avoids. The moist halogenated resin also typically has a water content of from about 60 to about 15 weight percent, based upon combined weight of water and resin. Water contents in excess of about 60 weight percent are generally avoided because of a need for greater energy requirements. Water contents of less than about 15 weight percent generally lead to agglomeration of resin particles.

When necessary, the moist halogenated resins are admixed with an amount of at least one organic or inorganic particulate additive before they are dried. The additive is talc, calcium stearate, calcium carbonate or stearic acid coated calcium carbonate. Other known anti-agglomeration additives may also be used provided they do not interface with the process of the present invention or react with the halogenated resin being dried. Two or more of the additives may be used in combination. The additive is beneficially talc or $ calcium stearate. The additives are used in an amount sufficient to generally preclude agglomeration of resin particles during drying thereof. If the additive is talc, the amount is beneficially from about two to about seven weight percent, based upon dry weight of resin. If the additive is calcium stearate, the amount is beneficially from about 0.5 to about two weight percent, based upon dry weight of resin. As noted herein, particulate additives are generally not needed when drying small quantities of halogenated resin as is the case with laboratory scale dryers.

One aspect of the present invention is a batch drying process. In the batch process, a heated inert drying gas is passed through the moist halogenated resin or, if necessary, the admixture at a fluidization velocity sufficient to establish and maintain the moist resin or admixture as a fluidized bed. The fluidization velocity is suitably from about 0.6 to about 1.6, beneficially from about 0.8 to about 1.2, meters per second. Lesser fluidization velocities are insufficient to provide a fluidized bed. Greater velocities, while attainable, are undesirable because they will cause the resin or admixture to be blown out of a fluidized bed apparatus, e.g., a fluidized bed dryer. The heated inert drying gas is passed through the resin or admixture for a period of time sufficient to provide a dried polymer resin having a reduced water content of from about 0.05 to about four weight percent, based upon combined weight of water and resin. The period of time also suffices to reduce the residual acid loading to a level of from about 5,000 to about 200, desirably from about 1000 to about 200, parts by weight of acid per million parts by weight of halogenated resin, based upon dry weight of resin. The dried polymer resin so produced is white in color. In other words, it has no visually detectable areas of discoloration. This is in sharp contrast to hues of yellow, brown or green which result when the process of the present invention is duplicated save for substituting air for the inert drying gas.

In the batch process, the inert drying gas is heated to a temperature of from about 65° to about 150° Centigrade. This is sufficient to provide a bed temperature of from about 20° to about 80° Centigrade. The bed temperature is beneficially from about 25° to about 65° Centigrade. If the bed temperature is less than about 20° Centigrade, drying times are uneconomically long. If the bed temperature is greater than about 80° Centigrade, polymer degradation can occur.

A second aspect of the present invention is a continuous or staged drying process. In a first stage of the continuous process, a first heated drying gas is passed through the moist halogeanted resin or admixture of moist halogenated resin and particulate additive at a fluidization velocity of from about 0.6 to about 1.6 meters per second as in the case of the batch process. The first heated drying gas is passed through the moist resin or admixture for a period of time sufficient to provide a partially dried polymer resin having a reduced water content of from about 5 to about 50 weight percent, based upon combined weight of water and resin. The period of time also suffices to reduce the residual acid loading to a level of from about 800 to about 30,000 parts by weight of acid per million parts of halogenated resin, based upon dry weight of resin.

In a second stage of the continuous process, the fluidized bed is maintained while a second heated drying gas is passed therethrough for a period of time. The period of time is sufficient to produce a nearly dry resin. The nearly dry resin has a reduced water content of from about 3 to about 30 weight percent, based upon combined weight of water and resin. The period of time also suffices to reduce the residual acid loading to a level of from about 600 to about 20,000 parts by weight of acid per million parts of halogenated resin, based upon dry weight of halogenated resin. The nearly dry resin is white with no visually detectable areas of discoloration.

If desired, the continuous process may have a third stage wherein a heated inert drying gas is passed through the fluidized bed of nearly dry resin for an additional period of time. The heated inert drying gas is suitably the same as the second heated drying gas. The additional period of time is sufficient to reduce the water content to a level of from about 0.05 to about four weight percent, based upon combined weight of resin and water. The residual acid loading is simultaneously reduced to a level of from about 5000 to about 200, desirably from about 1000 to about 200, parts per million parts of halogenated resin, based upon dry weight of said resin.

In the continuous process, a single drying gas may be used in all three stages provided it is an inert drying gas. The use of a single gas requires less complex equipment and precludes contamination of the drying gases due to intermixing thereof. If desired, air, rather than an inert gas, may be used in the first stage of the continuous process. The only qualifying condition on the use of air is that it must be replaced by an inert gas before the water content of the resin is reduced below a level of from about three to about ten weight percent, based upon combined weight of water and resin. If heated air is used below this level, degradation as evidenced by discoloration will occur. The aforementioned water and residual acid loadings for each of the stages of the continuous process are somewhat arbitrary. As such, they may be varied without adversely affecting product quality so long as the qualifying condition is satisfied. This may readily be done by using a single inert drying gas throughout the continuous process.

In the continuous process, the first heated drying gas is heated to a temperature of from about 90° to about 150° Centigrade. The second heated drying gas is heated to a temperature of from about 80° to about 140° Centigrade in the second stage. If the second stage is subdivided, each subdivision may have a different drying gas temperature in order to reduce the temperature as the resin dries. Alternatively, the temperature to which the second drying gas is heated may be reduced according to a predetermined profile. The inert drying gas is heated to a temperature of from about 65° to about 80° Centigrade in the optional third stage. These temperatures are chosen to maintain the temperature within the fluidized bed at less than about 80° Centigrade.

With the exception of the first drying gas which may be air, all drying gases are inert, irrespective of whether they are used in the batch process or the continuous process. The inert drying gas is selected from the group consisting of nitrogen, helium, neon, argon, krypton, xenon and radon. The drying gas is preferably nitrogen because of its cost and availability.

The following examples are for purposes of illustration only and are not to be construed as limiting the scope of the present invention. All parts and percentages are by weight unless otherwise stated. Arabic numerals identify examples of the present invention. Letters of the alphabet represent comparative examples.

First Drying Apparatus

A vertically disposed eight inch (20.3 centimeter) diameter stainless steel (type 316) tube equipped with a 20 mesh (850 micrometer) wedge wire screen, also type 16 stainless steel, was used as a drying apparatus. The tube had a length of about 1.5 meters. The bottom of the tube was fitted with an expansion chamber for receiving the drying gas and distributing it through the screen. The top of the tube was covered by a piece of wool blanket to preclude particle loss during drying. The tube was fitted with a sight glass near the screen to observe fluidization of halogenated resins. The tube was fitted with a door for addition of resin to the dryer. The door was located about 30 inches (762 centimeters) above the wire screen. The drying gas was heated with an electric heater and then passed into the expansion chamber via a pipe having an internal diameter of about one inch (2.54 centimeters).

Second Drying Apparatus

A larger scale fluidized bed dryer was prepared using a type 316 stainless steel tube having a length of two meters and an internal diameter of 35 centimeters as a dryer base. The bottom of the tube was fitted with an expansion chamber. A bed plate, also of type 316 stainless steel, having a rectangular pitch with a hole diameter of 1.5 millimeters was disposed immediately above the expansion chamber. The dryer was insulated to minimize heat loss. The tube was fitted with two sight glasses about 0.4 meters above the bed plate. The sight glasses allowed observation of fluidization. The tube was fitted with a door about 0.5 meters. The top of the tube was connected to a cyclone device which allowed an operator to remove resin carried out of the dryer by the heated drying gas. Exhaust gas from the cyclone was conveyed to a water scrubber. The water scrubber was used to remove residual acid and water from the drying gas and to cool the gas to a temperature suitable for recycle to the dryer. The scrubber was maintained at a temperature of about 15° Centigrade.

Determination of Weight of Acid in a Sample

Two grams of halogenated resin, e.g., chlorinated polyethylene, were added, with stirring, to fifty milliliters of tetrahydrofuran to form a solution. About thirty minutes later, one hundred sixty milliliters of deionized water were added to the solution to form a two-phase system having an aqueous phase and a solid matter. The aqueous phase was titrated with 0.1 N aqueous solution of silver nitrate.

Moisture Content Determination

A sample of resin was dried under a nitrogen atmosphere at a temperature of 80° Centigrade until no further weight change was recorded. By weighing the sample before and after drying, moisture content of the sample before drying was calculated.

EXAMPLE 1

Batch Process with Nitrogen as the Drying Gas

A sample of chlorinated polyethylene resin was removed from a reactor vessel through a special three quarter inch (1.9 centimeter) valve which allowed an operator to remove the sample in the form of a slurry. The sample was dewatered using a vacuum-assisted porcelain filter having a diameter of about twenty centimeters and for a period of about fifteen minutes. A vacuum was created by a water Jet pump. The filter device was commercially available from Curtis Scientific under the trade designation Spektrum. The sample weighed two and one-half pounds (1.1 kilograms) and had a water content of 60.1 percent by weight, based upon weight of sample. The sample had an initial residual acid loading of about 76,619 parts per million, based upon dry weight of the chlorinated polyethylene resin. The resin had a chemically bound chlorine content of about thirty-six percent by weight of polymer and was commercially available, in a caustic neutralized form, from The Dow Chemical Company under the trade designation TYRIN® CM 0136. The sample was added to the first drying apparatus and established as a fluidized bed by passing heated gaseous nitrogen through the sample at a fluidization velocity of about 0.8 meters/second. The nitrogen was heated to a temperature of about 60° Centigrade. The fluidized bed was maintained with the heated nitrogen for a period of 130 minutes. The resin was periodically evaluated for moisture content, residual acid content (ppm-wet) and residual hydrochloric acid loading using the procedures detailed herein. PPM-Wet was calculated according to Formula II provided herein. Results of the evaluations are summarized in Table I.

TABLE I

| Elapsed Time (Minutes) | Gas Temperature (°C.) | Moisture Content (Wt-%) | Residual Acid Loading (ppm) | Acid Content ppm-wet |
|---|---|---|---|---|
| 0 | 57 | 60.1 | 76,619 | 30,571 |
| 5 | 58 | — | 79,655 | 31,862 |
| 15 | 61 | 59.96 | 76,655 | 30,693 |
| 30 | 65 | 56.11 | 83,474* | 52,579* |
| 50 | 63 | 8.2 | 10,835 | 9,947 |
| 70 | 65 | 1.18 | 1,716 | 1,696 |
| 90 | 62 | 0.51 | 560 | 558 |
| 130 | 60 | 0.04 | 266 | 266 |

—not measured
*believed to be a bad data point

The data presented in Table I show the effectiveness of the present invention in terms of reducing moisture content and residual acid loading. The acid loading and content at 30 minutes are believed to be erroneous based upon the consistency of the remaining data. Similar results are attained with other inert drying gases and halogenated polymers.

Because of the small sample size, the resin was not admixed with a particulate additive prior to drying. Preparation of such an admixture would have been advisable with a commercial scale dryer and larger resin quantities.

The dried resin was white in color with no visible areas of discoloration. There was also no significant particle growth during drying.

Thermal Stability Determination

Dry blends of 2.5 grams of the dried resin, and either 0.025 or 0.050 grams of calcium stearate were prepared by hand mixing. Each dry blend was placed in a Pyrex brand glass tube and heated in an oil bath at a temperature of about 125° Centigrade to initiate dehydrohalogenation of the resin. Acid, e.g. hydrochloric acid, evolved during dehydrohalogenation was passed through a gas-liquid contactor cell equipped with conductivity electrodes. The electrodes were electrically connected to a conductivity meter. Thermal stability of the resin was indicated by elapsed time between the time the tube is placed in the oil bath and the onset of detectable evolution of acid and by the amount of acid released, measured as a voltage signal.

The dry blend containing 0.025 grams of calcium stearate had an elapsed time of 816 seconds. The dry blend containing 0.050 grams of calcium stearate had an elapsed time in excess of 14 minutes. A sample of the dried resin alone had an elapsed time of 45 seconds and a voltage signal of 0.5 volts.

EXAMPLE 2

Drying Chlorinated Polyethylene with Gaseous Nitrogen in a Closed Loop Drying Apparatus This example was used to simulate a continuous or multi-stage drying process. Changes in gas inlet temperature in a single vessel were substituted for mulitple stages at different temperatures. Twenty pounds (44 kilograms) of dewatered chlorinated polyethylene resin was mixed with 880 grams of dry calcium stearate powder for two minutes. The chlorinated polyethylene resin was commercially available, in a caustic neutralized form, from The Dow Chemical Company under the trade designation TYRIN ® 3615. The resin was removed from the reactor vessel following chlorination and dewatered. The calcium stearate powder had an average diameter of from about three to five microns. The mixture was added to the second drying apparatus and fluidized with gaseous nitrogen heated to a temperature of about 100° Centigrade and flowing at a fluidization velocity of 0.8 meters per second. After the temperature of the fluidized bed reached a temperature of about 60° Centigrade, the inlet feed temperature of the gaseous nitrogen was lowered to 66° Centigrade to avoid thermal degradation of the resin. Samples of the resin were taken at various intervals during drying thereof. The samples were analyzed for moisture content and residual acid content (wet basis). Results of the analyses, are summarized in Table II. The dried resin was white with no visible areas of discoloration. Particle growth was minimal.

TABLE II

Residual Acid Loading and Moisture Content Analyses

| Elapsed Time (Minutes) | Gas Temperature (°C.) | Bed Temperature (°C.) | Moisture content (Wt-%) | Acid content (ppm-wet) |
| --- | --- | --- | --- | --- |
| 5 | 100 | 42 | 42.2 | 28,451 |
| 20 | 100 | 51 | 30.3 | 32,956 |
| 31 | 100 | 55 | 29.1 | 37,845 |
| 50 | 66 | 62 | 7.0 | 21,841 |
| 70 | 66 | 66 | 0.3 | 2,257 |
| 90 | 66 | 66 | 0.2 | 1,489 |
| 110 | 66 | 66 | 0.2 | 1,346 |

The data presented in Table II show that residual acid content dropped considerably as the resin dried. The acid content at 31 minutes (37,845 ppm) reflects the effect of water removal upon Formula II used in calculating "ppm-wet". Lower residual acid contents are attainable with extended drying times as well as different drying temperatures.

COMPARATIVE EXAMPLE A

Using Heated Air as the Drying Gas

A third fluidized bed dryer apparatus was prepared using a stainless steel tube having a length of 2.5 meters and an internal diameter of fifty-one centimeters. A sieve plate having sieve openings of 1.5 millimeters was spaced 50 centimeters from the bottom of the tube thereby leaving enough space for a plenum or expansion chamber. Fluidization of resin during drying was observed through a window having a width of about 10 centimeters and a length (parallel the axis of the tube) of 100 centimeters. A door fitted into the tube about 1.5 meters above the sieve or bed plate was used for addition of the resin. The top of the tube was covered with a cotton cloth to preclude resin loss.

Ambient air was sucked into a compressor at a rate of 864 cubic meters per hour and discharged via a steam heated exchanger into the plenum chamber. A thermocouple mounted in the plenum chamber measured inlet gas temperature. A second thermocouple mounted twenty centimeters above the bed plate measured the temperature of the fluidized bed. Radial air pulse injections from five ports equally spaced slightly above the bed plate helped establish and maintain a fluidized bed.

Thirty-three and one-half pounds (15.2 kilograms) of the same chlorinated polyethylene resin as in Example 1 were added to the third drying apparatus. Samples taken at ten minute intervals were evaluated for moisture and residual acid content. Gas temperatures and bed temperature readings were taken concurrent with sample removal. PPM-wet was calculated according to Formula II and Residual Acid Loading was calculated according to Formula I. Table III summarizes data gathered during drying.

TABLE III

Air Dried Resin

| Time | Fluid Temp °C. | Bed T °C. | H₂O % Moisture | HCl ppm-wet | Residual Acid Loading |
| --- | --- | --- | --- | --- | --- |
| 10 | 76 | 30.5 | 51.6 | 9971 | 20608 |
| 20 | 76 | 41.6 | 36.2 | 9828 | 15404 |
| 30 | 76 | 48.9 | 27.6 | 9013 | 12448 |
| 40 | 76 | 53.3 | 17.7 | 8756 | 10639 |
| 50 | 76 | 61.1 | 7.2 | 5951 | 6413 |
| 60 | 76 | 73.8 | 0.38 | 1505 | 1511 |
| 70 | 76 | 75.6 | 0.48 | 828 | 832 |
| 80 | 76 | 72.2 | 0.28 | 794 | 794 |
| 90 | 76 | — | 0.62 | 636 | 634 |

— = not measured

The sample removed from the dryer after forty minutes showed the first sign of degradation as evidenced by a pale yellow color. Subsequent samples exhibited signs of further degradation by changing color through shades or hues of green to brown.

Thermal stability testing of the dry resin without calcium stearate, using the procedure of Example 1 provided an elapsed time of 45 seconds and a voltage signal of 8.5 volts. In other words, the air dried resin was much less stable than the resin dried with an inert gas.

A comparison of Example 1 with Comparative Example A shows that while both yield a "dry" resin with low residal acid, the latter resin is discolored, somewhat degraded and therefore generally useless whereas the former exhibits neither discoloration nor degradation. Similar results are expected with other halogenated resins and inert drying gases, all of which are disclosed herein.

EXAMPLE 3

Batch Drying With Nitrogen as the Drying Gas

A sample of a chlorinated polyethylene slurry was removed from a reactor vessel and dewatered as in Example 1. The resin had a chemically bound chlorine content of 42 percent by weight of polymer and was commercially available, in a caustic neutralized form, from The Dow Chemical Company under the trade designation TRYIN ® 4213. The apparatus and procedure of Example 1 were duplicated except that the nitrogen was heated to 70° Centigrade and drying was continued for 200 minutes. Following drying, the resin was white with no visible areas of discoloration. There was no significant particle growth during drying.

Residual acid and moisture contents determined from samples taken during drying are summarized in Table IV.

TABLE IV

Nitrogen Drying of Chlorinated Polyethylene Resin

| Sample Time | Residual Acid Content (ppm-wet) | Moisture Content (Wt-%) |
| --- | --- | --- |
| 10 | 55.5 | 33514 |
| 25 | 34.8 | 28528 |
| 35 | 32.0 | 22270 |
| 45 | 14.1 | 14055 |

TABLE IV-continued

| | Nitrogen Drying of Chlorinated Polyethylene Resin | |
|---|---|---|
| Sample Time | Residual Acid Content (ppm-wet) | Moisture Content (Wt-%) |
| 55 | 7.1 | 10425 |
| 65 | 0.42 | 1877 |
| 75 | 0.05 | 742 |
| 85 | <0.05 | 593 |
| 105 | <0.05 | 389 |

Increased drying time (200 minutes) was due a low ambient temperature which led to considerable heat loss.

EXAMPLE 4

Duplication of Example 3 with Increased Drying Temperature

A sample of the same resin as in Exxample 3 was dried using the procedure of that Example except that the gaseous nitrogen was heated to 80° Centigrade rather than 70° Centigrade. Following drying, the resin was free of discoloration or significant particle growth as in Example 3.

Results of drying are summarized in Table V.

TABLE V

| | Nitrogen Drying of Chlorinated Polyethylene Resin | |
|---|---|---|
| Sample Time | Residual Acid Content (ppm-wet) | Moisture Content (Wt-%) |
| 0 | 51.4 | 31440 |
| 15 | 42.8 | 35600 |
| 30 | 3.4 | 34830 |
| 45 | 15.0 | 24080 |
| 60 | 4.5 | 9959 |
| 90 | 0.57 | 2470 |
| 105 | 0.09 | 684 |
| 120 | <0.05 | 513 |
| 135 | <0.05 | 493 |
| 200 | <0.05 | 380 |

The data summarized in Tablels IV and V demostrate that drying and acid removal according to the present invention are quite effective. Even at such low acid levels and elevated drying gas temperatures, the dried resins are free of discoloration. Similar results are attainable with other halogenated resins and inert drying gases which are disclosed herein.

What is claimed is:

1. A process for drying, and stripping residual acid from, a moist halogenated resin separated from an aqueous acid suspension of said the suspension consisting essentially of water, acid and halogenated resin, halogenated resin consisting essentially of the resin, an amount of water an amount of residual acid, the amount of water being from about 60 to about 15 weight percent, based upon combined weight of water and resin the acid content being from about 80,000 to about 1,000 parts by weight of acid per million parts by weight of halogenated resin, based upon dry weight of halogenated resin, the process comprising passing a heated inert drying gas through the moist resin (a) at a fluidization velocity sufficient to establish and maintain the admixture of resin and inert drying gas as a fluidized bed and (b) for a period of time sufficient to produce a dried polymer resin which is white in color with no visually detectable areas of discoloration and which has a water content of from about 0.05 to about 4 weight percent, based upon combined weight of water and resin, and a residual acid loading of from about 5,000 200 parts by weight of acid per million parts by weight of halogenated resin upon dry weight of halogenated resin.

2. The process of claim 1 further comprising a preliminary step which precedes drying, the preliminary step comprising preparing an admixture of the moist halogenated resin and at least one organic or inorganic particulate additive, the additive(s) being present in an amount sufficient to generally preclude agglomeration of resin particles during drying thereof.

3. The process of claim 1 wherein the residual acid loading of the dried polymer resin is from about 1000 to about 200 parts by weight of acid per million parts by weight of halogenated resin, based upon dry weight of halogenated resin.

4. The process of claim 1 wherein the inert drying gas is selected from the group consisting of nitrogen, helium, neon, argon, krypton, xenon and radon.

5. The process of claim 1 wherein the inert drying gas is nitrogen.

6. The process of claim 1 wherein the drying gas is heated to a temperature sufficient to provide a bed temperature of less than about 80° Centigrade.

7. The process of claim 6 wherein the bed temperature is from about 25° to about 65° Centigrade.

8. The process of claim 6 wherein the drying gas is heated to a temperature of from about 65° to about 150° Centigrade.

9. The process of claim 1 wherein the halogenated resin is chlorinated polyethylene, brominated polyethylene or bromochlorinated polyethylene.

10. The process of claim 1 wherein the halogenated resin is chlorinated polyethylene.

11. The process of claim 10 wherein the residual acid is hydrochloric acid.

12. The process of claim 2 wherein the additive is talc, calcium stearate, calcium carbonate or stearic acid coated calcium carbonate.

13. The process of claim 2 wherein the additive is talc.

14. The process of claim 13 wherein the amount of talc is from about two to about seven weight percent, based upon dry weight of resin.

15. The process of claim 2 wherein the additive is calcium stearate.

16. The process of claim 15 wherein the amount of calcium stearate is from about 0.5 to about two weight percent, based upon dry resin weight.

17. The process of claim 1 wherein the fluidization velocity is from about 0.6 to about 1.6 meters per second.

18. A process for drying, and stripping residual acid from, a moist halogenated resin separated from an aqueous acid suspension of said resins, said moist resins having a water content of from about 60 to about 15 weight percent, based upon combined weight of water and resin, and a residual acid loading of from about 80,000 to about 1,000 parts of acid per million parts of resin, based upon dry weight of resin, the process comprising:

a. passing a first heated drying gas through the moist resin at a. rate of flow sufficient to establish and maintain said admixture as a fluidized bed and for a period of time sufficient to produce a partially dried polymer resin having a water content of from about 5 to about 50 weight percent, based upon combined weight of water and resin, and a residual acid loading of from about 800 to about 30,000 parts by weight of acid per million parts by weight of halogenated resin, based upon dry weight of resin; and b. continuing to maintain the fluidized bed while passing a second heated drying gas therethrough for a period of time sufficient to produce a nearly dry resin having a water content of from about 3 to about 30 weight percent, based upon combined weight of water and resin and a residual acid loading of from about 600 to about 20,000 parts by weight of acid per million parts of halogenated resin, based upon dry weight of halogenated resin, the nearly dry resin being white with no visually detectable areas of discoloration.

19. The process of claim 18 also comprising a preliminary step which precedes step a, said preliminary step comprising preparing an admixture of a moist halogenated polymer resin and an organic or inorganic particulate additive, said additive being present in an amount sufficient to generally preclude agglomeration of the resin during drying thereof.

20. The process of claim 18 further comprising a step c wherein the nearly dry resin is maintained as a fluidized bed by passing the second heated drying gas therethrough for a period of time sufficient to reduce the water content to a level of from about 0.05 to about 4 weight percent, based upon combined weight of resin and water, and the residual acid content to a level of from about 5000 to about 200 parts per million parts of resin.

21. The process of claim 19 further comprising a step c wherein the nearly dry resin is maintained as a fluidized bed by passing the second heated drying gas therethrough for a period of time sufficient to reduce the water content to a level of from about 0.05 to about 4 weight percent, based upon combined weight of resin and water, and the residual acid content to a level of from about 5000 to about 200 parts per million parts of resin.

22. The process of claim 20 wherein the residual acid loading of the dried polymer resin is from about 1000 to about 200 parts by weight of acid per million parts by weight of halogenated resin, based upon dry weight of halogenated resin.

23. The process of claim 21 wherein the residual acid loading of the dried polymer resin is from about 1000 to about 200 parts by weight of acid per million parts by weight of halogenated resin, based upon dry weight of halogenated resin.

24. The process of claim 18 wherein the first heated drying gas is selected from the group consisting of air, nitrogen, helium, neon, argon, krypton, xenon and radon.

25. The process of claim 18 wherein the second heated drying gas is selected from the group consisting of nitrogen, helium, neon, argon, krypton, xenon and radon.

26. The process of claim 18 wherein the first and second heated drying gases are nitrogen.

27. The process of claim 18 wherein the first heated drying gas is heated to a temperature of from about 90° to about 150° Centigrade.

28. The process of claim 18 wherein the second heated drying gas is heated to a temperature of from about 80° to about 140° Centigrade in step c.

29. The process of claim 20 wherein the second drying gas is heated to a temperature of from about 65° to about 80° Centigrade in step c.

30. The process of claim 21 wherein the second drying gas is heated to a temperature of from about 65° to about 80° Centigrade in step c.

* * * * *

UNITED STATES PATENT AND TRADEMARK OFFICE
CERTIFICATE OF CORRECTION

PATENT NO. : 4,730,035

DATED : March 8, 1988

INVENTOR(S) : Frank E. Mark, Charles B. Carpenter, and James B. Akers, Jr.

It is certified that error appears in the above-identified patent and that said Letters Patent is hereby corrected as shown below:

Column 4, line 43, delete "$".

Column 7, line 42 please delete "Jet" and insert -- jet --.

Column 11, line 20 please delete "Exxample" and insert -- Example --.

Column 11, line 43 please delete "Tablels" and insert -- Tables --.

Column 11, line 43 please delete "demostrate" and insert -- demonstrate --.

Column 11, line 53 please delete "said" and insert -- said resin, --.

Column 11, line 54 please delete "resin," and insert -- resin, the moist --.

Column 11, line 56 please delete "water" and insert -- water and --.

Column 11, line 58 please delete "resin" and insert -- resin, and --.

Column 12, line 3 please delete "5,000" and insert -- 5,000 to about --.

Column 12, line 5 please delete "resin upon" and insert -- resin, based upon --.

Signed and Sealed this

Twenty-second Day of November, 1988

*Attest:*

DONALD J. QUIGG

*Attesting Officer*     *Commissioner of Patents and Trademarks*